Aug. 28, 1962 W. M. CRUMP ETAL 3,051,422
FISHING ROD HOLDER
Filed Nov. 12, 1959 2 Sheets-Sheet 1
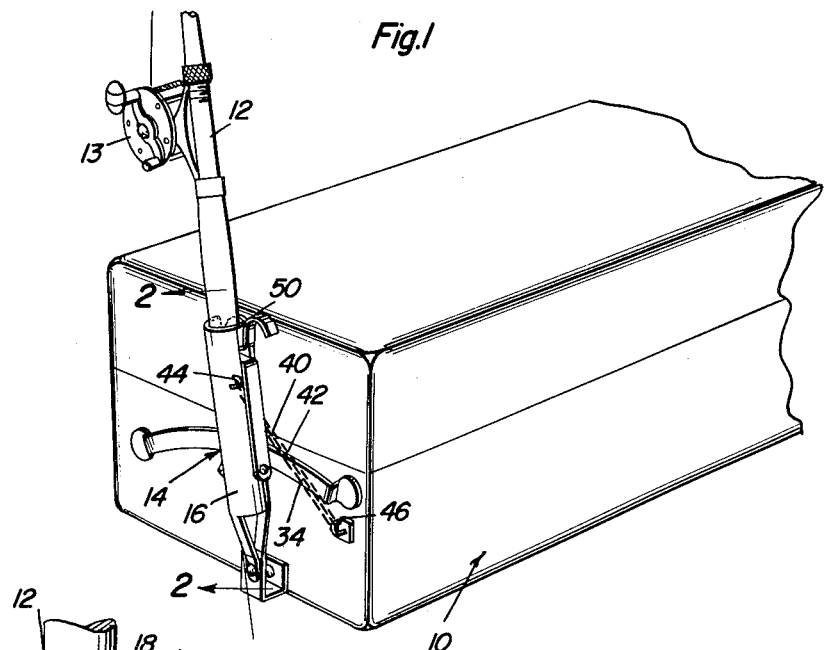
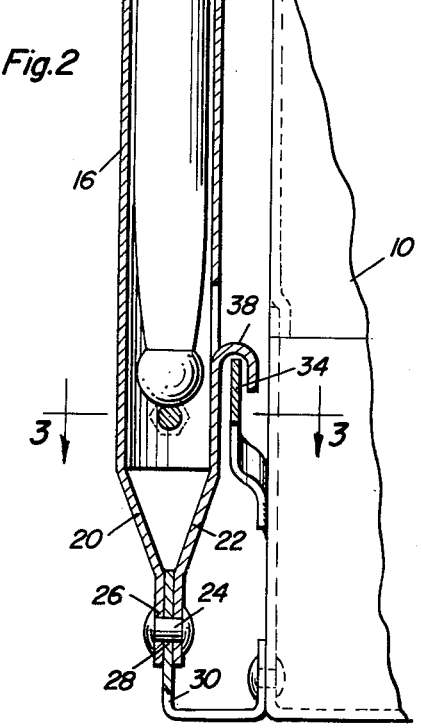
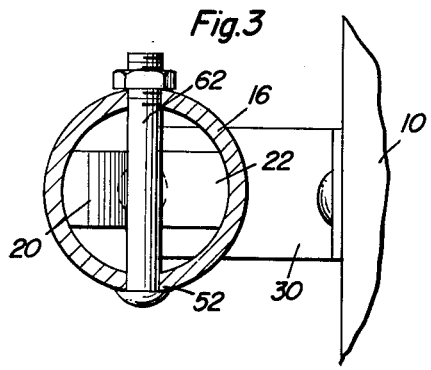
William M. Crump
Donald A. Vaillancourt
James B. Bowens
INVENTORS
BY *Clarence A. O'Brien*
and *Harvey B. Jacobson*
Attorneys

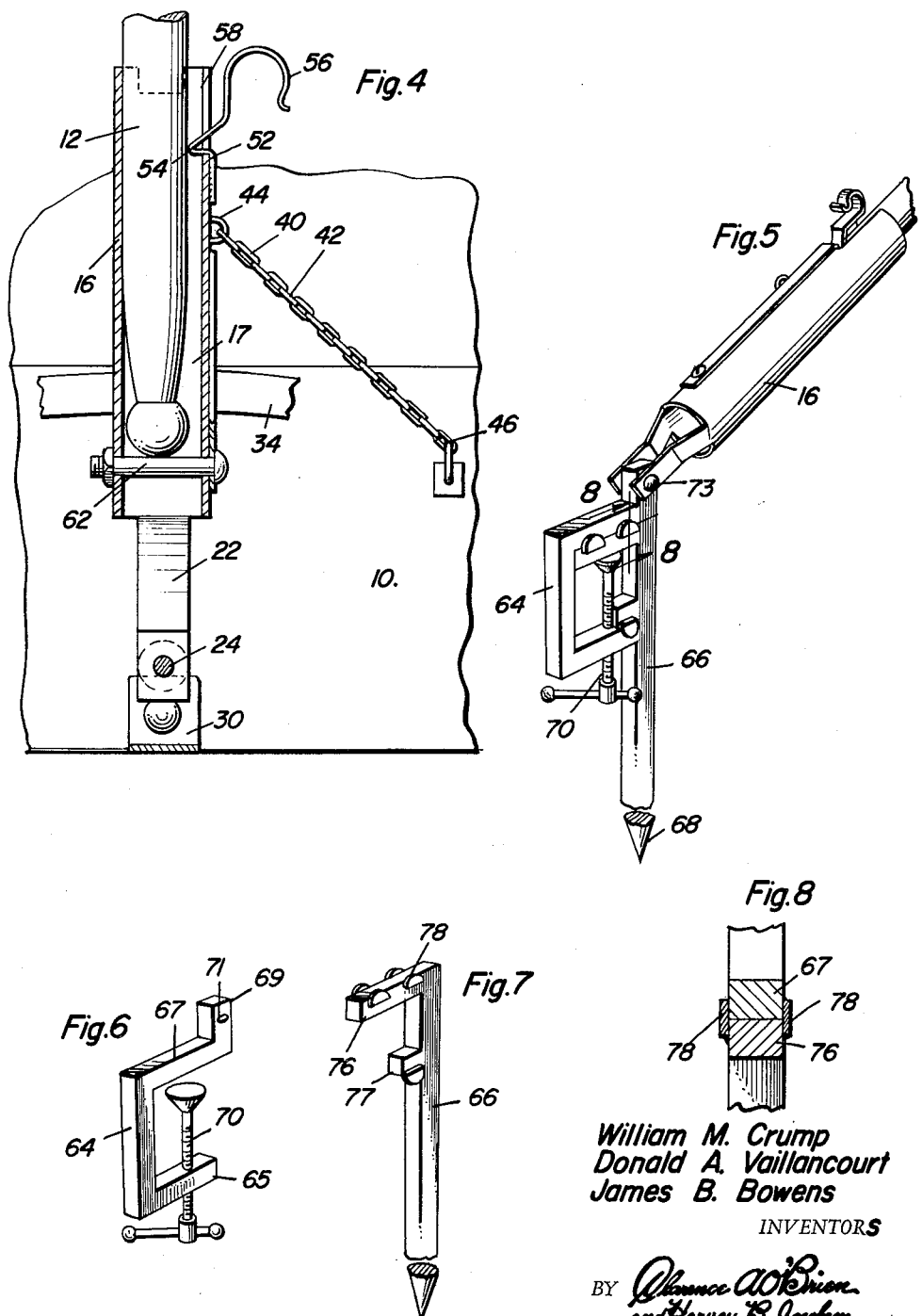

//2,051,422
FISHING ROD HOLDER

William M. Crump, Atherton, Calif. (1700 California Ave., Mountain View, Calif.), and Donald A. Vaillancourt, Box 408, and James B. Bowens, 2345 Middlefield Road, both of Redwood City, Calif.
Filed Nov. 12, 1959, Ser. No. 852,470
2 Claims. (Cl. 248—40)

This invention relates to fishing rod holders and more particularly to a fishing rod holder capable of being used in a number of capacities.

An object of the invention is to provide a fishing rod holder which may be attached to a tackle box or the like, secured to a boat or fastened to a ground anchor or used in numerous other ways in order to support a fishing rod.

Briefly, the invention is embodied in a holder which is securable to anchoring devices of a diversity of configurations. For example, the holder may be secured adjustably to a tackle box or adjustably secured to a ground anchor or adjustably secured to the seat, gunwale or some other part of a boat.

Although there have been numerous prior holders for fishing rods, it is believed that a holder in accordance with this invention is considerably more versatile and much simpler in construction keeping in mind the numerous applications with which the holder is intended. Further, there is an adjustment associated with each different application of the holder lending practicability to the holder.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a tackle box and fishing rod together with a perspective view of a holder configured in accordance with the invention and operatively connected with the tackle box.

FIGURE 2 is an enlarged sectional view taken on the line 2—2 of FIGURE 1.

FIGURE 3 is a sectional view taken on the line 3—3 of FIGURE 2.

FIGURE 4 is a sectional view of the holder on the tackle box as shown in FIGURE 1, but showing the holder in a second position of adjustment.

FIGURE 5 is a perspective view showing a ground anchor adapted to be used in conjunction with the holder.

FIGURE 6 is a perspective view of a clamp constituting a part of the ground anchor in FIGURE 1, but enabling the holder to be secured to various other objects, for instance a part of a boat.

FIGURE 7 is a perspective view showing another part of the ground anchor in FIGURE 5.

FIGURE 8 is an enlarged sectional view taken on the line 8—8 of FIGURE 5 and showing a detail of construction.

In the accompanying drawings FIGURE 1 discloses a tackle box 10 which diagrammatically represents any container which the fisherman may have use for. The word "tackle box" therefore are intended to mean any type of container with which the fisherman uses holder 14. The holder has fishing rod 12 mounted therein and here again, the fishing rod is only a diagrammatic representation of any type of fishing rod either with or without reel 13.

Holder 14 is made of a tube 16 having an open end 18 constituting an entrance for the fishing rod 12. The lower end of tube 16 has two angulated legs or strips 20 and 22 depending therefrom and brought together adjacent to each other. A bolt, rivet 24 or other suitable fastener, is passed through aligned openings 26 in the adjacent parts of strips 20 and 22 and through an opening 28 in essentially U-shaped bracket 30. The bracket is fixed, for instance by being welded or riveted to one end of tackle box 10. The rivet or bolt 24 establishes an axis of oscillation for tube 16.

An arcuate bracket 34 is fixed, for instance by being welded, at its ends to the end of tackle box 16. There are offsets at the ends of the bracket 34 so that the major part of bracket 34 is spaced slightly from the wall of the tackle box. A guide 38, for instance a downwardly opening hook, is struck from or otherwise mechanically fixed to tube 16 and engages the bracket 34 with a part of the hook in the space between the bracket and the wall of the tackle box. The bracket 34 together with hook 38 constrains the pivotal motion of the holder tube 16. This motion is limited by a stop structure 40 preferably made of a lightweight chain 42 attached at one end, for instance by hook 44, to the tube 16 intermediate the upper and lower ends thereof. The opposite end of the chain is engaged in a stationary hook 46 which is fixed to the end of tackle box 10. The length of the chain may be adjusted by engaging different links with hook 46 (compare FIGURES 1 and 4).

Clamp or latch 50 is adapted to engage the handle or hand grip of the fishing rod 12 and hold it secured in tube 16. Clamp 50 is made of a flat spring metal strip 52 having a projection 54 (FIGURE 2) near the hook finger grip 56 at the upper extremity thereof. The projection 52 extends through a slot 58 in the side wall of tube 16 and bears against the hand grip of the fishing rod 12 when it is disposed in tube 16. The lower end of strip 52 is held fastened to the tube 16 by a bolt 62, the latter extending through aligned apertures near the lower part of tube 16. The bolt 62 also forms a bottom for the upwardly opening pocket 17 in tube 16 within which the handle of the fishing rod 12 is accommodated. In other words, the lower reach of the handle of the fishing rod in tube 16 is established by the extremity of the rod contacting bolt 62.

FIGURE 5 shows how holder tube 16 can be used without the tackle box 10. The tube may be pivotally secured to a C-clamp 64, and the C-clamp supported by a ground engaging rod 66 having a pointed lower end 68. The C-clamp includes a screw 70 carried by a lower shorter leg 65 thereof. The upper longer leg 67 of the C-clamp has an upwardly extending part 69 within which aperture 71 is formed. Bolt 73 is adapted to pass through the openings 26 in strips 20 and 22 and also extend through aperture 71. This fastens the tube 16 onto the part 69 of the C-clamp 64. The clamp, of course, may be secured to any suitable support, for example a part of boat. Furthermore, clamp 64 may be secured to the special ground engaging device comprising a generally F-shaped post 66 shown in FIGURE 7. This device when used with the C-clamp constitutes the arrangement and assembly shown in FIGURE 5. Post 66 has a part of parallel arms 76 and 77 protruding laterally therefrom, and there are guides 78 extending upwardly and downwardly respectively from arms 76 and 77 and forming passages within which the sides 67 and 65 of the C-clamp are adapted to slide. Then tightening the screw 70 will engage the C-clamp with the post 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and

What is claimed as new is as follows:

1. A fishing rod holder comprising a generally F-shaped post, a removable C-clamp slidably mounted on the arms of said post, a tube pivotally and removably mounted on said C-clamp, and means for securing a fishing rod in said tube, said post including pairs of guides on said arms thereof slidably receiving the legs of said C-clamp therebetween.

2. A fishing rod holder comprising a generally F-shaped post, a removable C-clamp slidably mounted on the arms of said post, a tube pivotally and removably mounted on said C-clamp and means for securing a fishing rod in said tube, said post including pairs of guides on said arms thereof slidably receiving the legs of said C-clamp therebetween, said C-clamps including a screw threadedly mounted in one of its legs and cooperable with its other leg for securing one of said post arms therebetween.

References Cited in the file of this patent

UNITED STATES PATENTS

| | | |
|---|---|---|
| 1,085,084 | Haines | Jan. 20, 1914 |
| 2,596,403 | Hoffman | May 13, 1952 |
| 2,720,048 | Bracey et al. | Oct. 11, 1955 |
| 2,727,707 | Wells | Dec. 20, 1955 |
| 2,835,066 | Spilker | May 20, 1958 |
| 2,849,249 | Fridolph | Aug. 26, 1958 |
| 2,886,268 | Ahrens | May 12, 1959 |
| 2,908,099 | Burke | Oct. 13, 1959 |
| 2,918,237 | Boesch | Dec. 22, 1959 |